United States Patent
Chan et al.

(10) Patent No.: US 9,473,402 B2
(45) Date of Patent: Oct. 18, 2016

(54) METHODS AND SYSTEMS FOR RECEIVING AND TRANSMITTING INTERNET PROTOCOL (IP) DATA PACKETS

(71) Applicant: Pismo Labs Technology Limited, Hong Kong (HK)

(72) Inventors: Ho Ming Chan, Hong Kong (HK); Sze Hon Chan, Hong Kong (HK)

(73) Assignee: PISMO LABS TECHNOLOGY LIMITED (HK)

( * ) Notice: Subject to any disclaimer, the term of this patent is extended or adjusted under 35 U.S.C. 154(b) by 203 days.

(21) Appl. No.: 14/125,952

(22) PCT Filed: Mar. 15, 2013

(86) PCT No.: PCT/IB2013/052058
§ 371 (c)(1),
(2) Date: Dec. 13, 2013

(87) PCT Pub. No.: WO2014/140693
PCT Pub. Date: Sep. 18, 2014

(65) Prior Publication Data
US 2015/0016464 A1 Jan. 15, 2015

(51) Int. Cl.
*H04L 12/741* (2013.01)
*H04L 12/933* (2013.01)
(Continued)

(52) U.S. Cl.
CPC .............. *H04L 45/74* (2013.01); *H04L 49/15* (2013.01); *H04L 49/25* (2013.01);
(Continued)

(58) Field of Classification Search
CPC . H04L 12/741; H04L 12/947; H04L 12/933; H04L 12/28; H04L 12/56; H04L 29/12; H04L 29/06; H04L 29/12066; H04L 29/12349; H04L 29/12396; H04L 29/12405; H04L 63/209; H04L 63/0428; H04L 67/2819; H04L 49/15; H04L 49/25; H04L 45/74; H04L 45/28; H04L 45/02; H04L 61/2507; H04L 61/251; H04L 61/2525; H04L 61/2528; H04L 63/30–63/308; H04W 8/14; H04W 80/04
USPC ................. 370/401, 395.31, 395.3; 711/221; 709/232, 245
See application file for complete search history.

(56) References Cited

U.S. PATENT DOCUMENTS 6,640,251 B1 * 10/2003 Wiget ................... H04L 12/185
709/228

(Continued)

FOREIGN PATENT DOCUMENTS

| CN | 101030966 A | 9/2007 |
|---|---|---|
| CN | 101202742 A | 6/2008 |
| CN | 102026199 A | 4/2011 |

OTHER PUBLICATIONS

International Search Report in International Application No. PCT/IB2013/052058, mailed on Jan. 2, 2014.
(Continued)

*Primary Examiner* — Andrew Chriss
*Assistant Examiner* — Rasha Fayed (57) ABSTRACT

Methods and systems which receive and transmit an IP data packet at a network device via a first network interface if the IP data packet satisfies an interception policy, and via a second network interface if the IP data packet does not satisfy the interception policy. The decision to use the first network interface or the second network interface depends on whether the IP data packet satisfies the interception policy. The IP data packet is either received by the network device or created by the network device. If the IP data packet is created by the network device, the source address of the IP data packet is reachable via the first network interface. When the IP data packet is received by the network device and also satisfies the interception policy, another IP data packet is transmitted via the first network interface as a response and its source address is an IP address reachable via the first network interface. Its destination address is source address of the IP data packet received by the network device.

27 Claims, 8 Drawing Sheets

(51) Int. Cl.
*H04L 12/947* (2013.01)
*H04L 29/12* (2006.01)
*H04L 29/08* (2006.01)
*H04L 29/06* (2006.01)

(52) U.S. Cl.
CPC ....... *H04L 61/2007* (2013.01); *H04L 67/2819* (2013.01); *H04L 63/0209* (2013.01); *H04L 63/0428* (2013.01)

(56) References Cited

U.S. PATENT DOCUMENTS

| | | | | |
|---|---|---|---|---|
| 7,111,163 B1* | 9/2006 | Haney | ................ | H04L 12/4633 709/227 |
| 2001/0017857 A1* | 8/2001 | Matsukawa | ....... | H04L 29/12018 370/392 |
| 2003/0142365 A1* | 7/2003 | Wu | ................... | H04N 1/00281 358/402 |
| 2006/0002324 A1* | 1/2006 | Babbar | ............... | H04L 29/1232 370/325 |
| 2007/0110046 A1* | 5/2007 | Farrell | ................... | H04L 69/04 370/389 |
| 2008/0247399 A1* | 10/2008 | Hazard | .................. | H04L 45/02 370/395.31 |
| 2009/0001173 A1* | 1/2009 | Sevier | ................ | G06K 7/10851 235/462.41 |
| 2009/0016349 A1* | 1/2009 | Cha | ...................... | H04N 7/1675 370/392 |
| 2009/0279432 A1* | 11/2009 | Solis | ................... | H04M 3/2281 370/235 |
| 2009/0285224 A1* | 11/2009 | Vayssiere | ................ | G06F 9/541 370/401 |
| 2010/0005188 A1* | 1/2010 | Solis | ..................... | H04L 63/306 709/232 |
| 2012/0082132 A1* | 4/2012 | Andreasen | ......... | H04L 12/4633 370/331 |
| 2012/0259994 A1* | 10/2012 | Gillies | ................ | H04L 12/1881 709/231 |
| 2014/0233384 A1* | 8/2014 | Howard | ............ | H04W 28/0289 370/235 |

OTHER PUBLICATIONS

Written opinion of the International Searching Authority in International Application No. PCT/IB2013/052058, mailed on Jan. 2, 2014.

* cited by examiner

METHODS AND SYSTEMS FOR RECEIVING AND TRANSMITTING INTERNET PROTOCOL (IP) DATA PACKETS

SUMMARY OF THE INVENTION

The present invention is directed to methods and systems which provide receiving Internet Protocol (IP) data packets and responding with IP data packets at a network gateway. The network gateway is not assigned with an IP address for its network interfaces or at least two of its network interface are not assigned IP address.

According to one of the embodiments of the present invention, in order to receive an IP data packet via a first network interface of the network gateway without an IP address, the network gateway inspects IP data packets passing through the first network interface. If an IP data packet satisfies an interception policy, the network gateway determines that the IP data packet is intended for it and does not forward the IP data packet via a second network interface. On the other hand, when the IP data packet does not satisfy the interception policy, the network gateway determines that the IP data packet is not intended for it and forwards the IP data packet to the destination indicated in the destination address of the IP data packet via the second network interface.

As the network gateway has no IP address, the source address of an IP data packet originating from the network gateway uses an IP address that belongs to a range of IP addresses that it can intercept.

When an IP data packet that is intended for the network gateway has arrived at the network gateway, the network gateway is able to intercept the IP data packet and does not forward the IP packet to other nodes. The destination address of the IP data packet belongs to an IP address that is reachable by the network gateway.

According to one of the embodiments of the present invention, the network gateway has three or more network interfaces. The first and second network interfaces are not assigned with IP address and the other one or more network interfaces are assigned with IP addresses. IP data packets received via the other one or more network interfaces designated for nodes connecting to the first or second network interface are routed accordingly without interception. Similarly, IP data packets received via the first or second network interface and designated for one of the other one or more network interfaces are also routed accordingly without interception. However, IP data packets received via the other one or more network interfaces designated for the network gateway are intercepted by the network gateway.

BACKGROUND ART

When managing a network gateway through an IP network, the network gateway needs an IP address for communication. The IP address of the network gateway allows IP data packets be routed to the network gateway and allows the network gateway to transmit IP data packets.

However, in certain network environment, there are not enough IP addresses. As a result, there may not be any additional IP addresses available for the use of the network gateway. In such case, the network gateway may still be able to route and/or switch IP data packets, but it cannot transmit its own IP data packets or receive IP data packets destined to the network gateway.

Figure 0001:
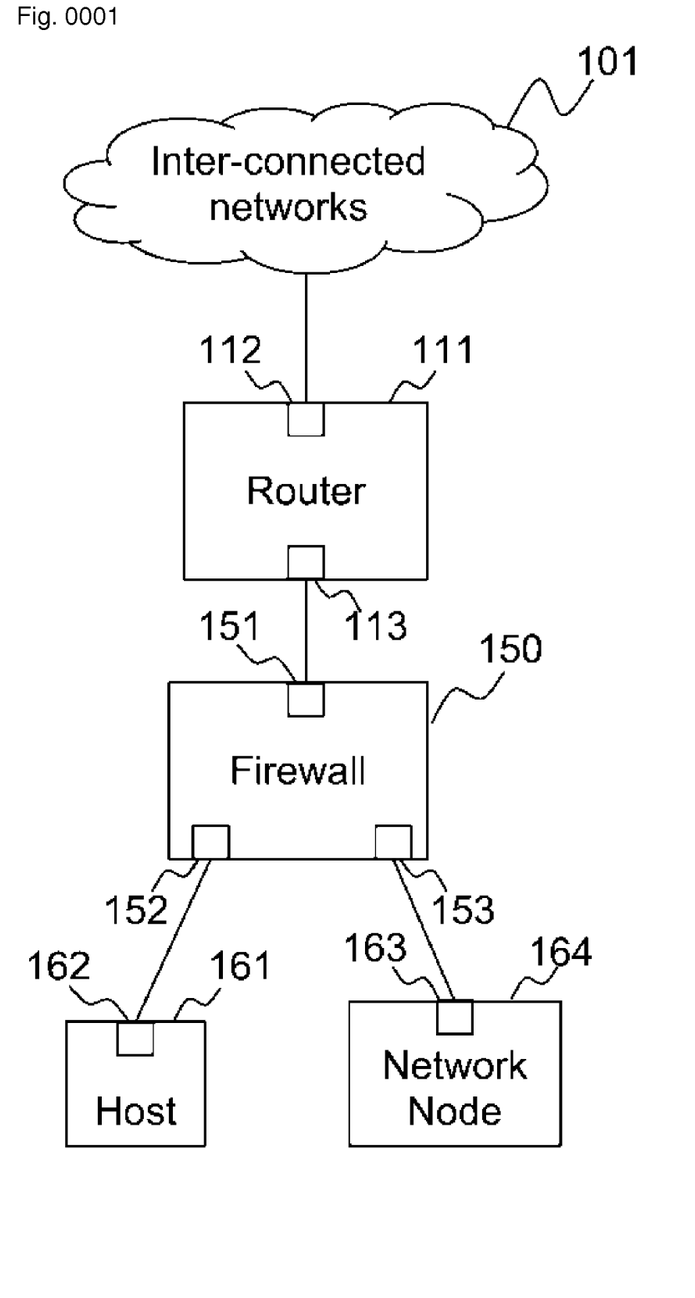

FIG. 1 is a typical network environment where router 111 connects to firewall 150 via network interface 113 to connect to inter-connected networks 101 via network interface 112. Inter-connected networks 101 may be the Internet or another network. Firewall 150 connects to router 111 via network interface 151, connects to host 161 via network interface 152 and connects to network node 164 via network interface 153. IP enabled devices are connected to firewall 150, such as host 161 via network interface 162 and network node 164 via network interface 163. Each of network interfaces 112, 113, 151, 152, 153, 162 and 163 is assigned with one IP address. Therefore there are seven IP addresses needed. The internet service provider (ISP) may then assign seven IP addresses for router 111 to use. Host 161 and network node 164 are nodes which are capable of sending, receiving, or forwarding Internet Protocol (IP) data packets.

Figure 0002:
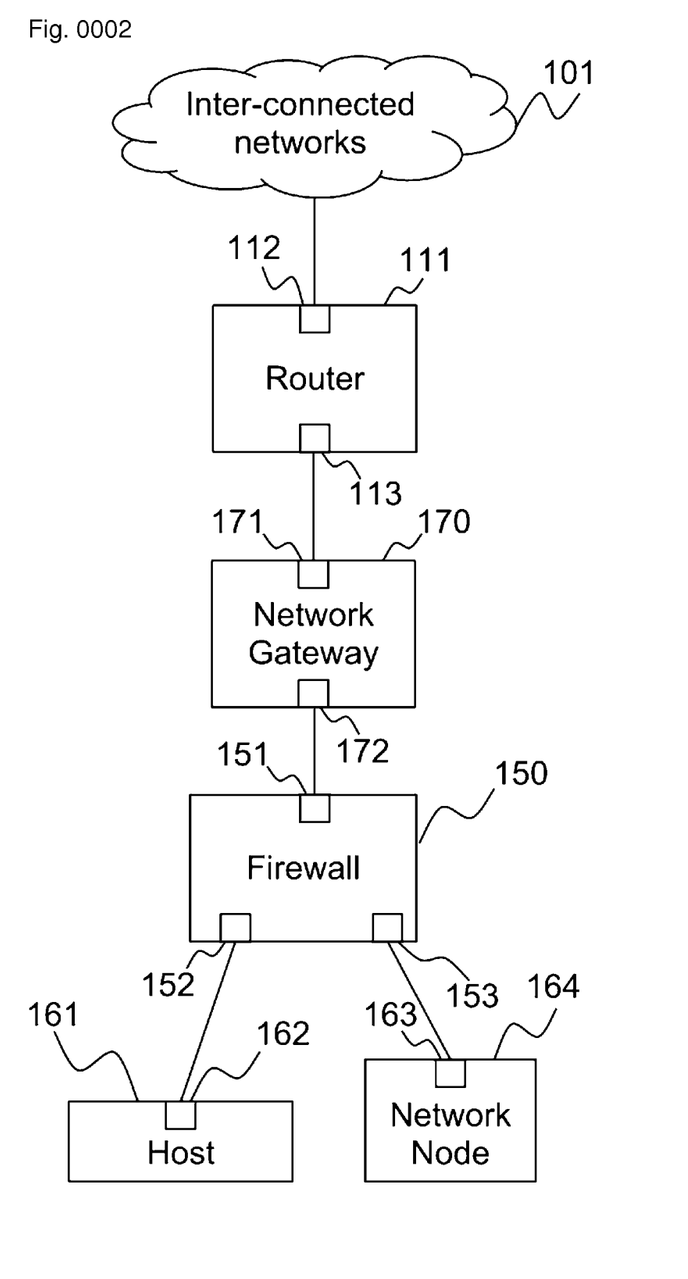

In FIG. 2, when network gateway 170 is added between router 111 and firewall 150, the problem is that there is no further IP address available to assign to network interfaces 171 and 172 of network gateway 170.

From discussion above, it should be apparent that there is a need for a network gateway to communicate with other nodes in an IP network in which the network gateway is not assigned with an IP address.

DISCLOSURE OF INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processing unit(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

For readability, a network node describe herein is capable of sending, receiving, or forwarding Internet Protocol (IP) data packets, such as a host computer, a router, a switch, a virtual machine, an access point, a gateway, a communication device or a mobile phone.

FIG. 2 is a network environment where router 111 connects to network gateway 170 via network interface 113 to connect to inter-connected networks 101 via network interface 112. Inter-connected networks 101 may be the Internet or another network. Network gateway 170 connects to router 111 via network interface 171 and connects to firewall 150 via network interface 172. Firewall 150 connects to network gateway 170 via network interface 151, connects to host 161 via network interface 152 and connects to network node 164 via network interface 153. IP enabled devices are connected to firewall 150, such as host 161 via network interface 162 and network node 163 via network interface 164. Each of network interfaces 112, 113, 151, 152, 153, 162 and 163 is assigned with one IP address. However, network interfaces 171 and 172 are not assigned with any IP address.

METHODS

Receiving an IP Data Packet

According to one of the embodiments of the present invention, in order to process IP data packets via a first network interface of a network gateway without an IP address, the network gateway inspects IP data packets passing through its network interfaces. If an IP data packet satisfies an interception policy, the network gateway determines that the IP data packet is intended for it and does not forward the IP data packet to nodes connecting to its network interfaces. Otherwise, when the IP data packet does not satisfy the interception policy, the network gateway determines that the IP data packet is not intended for it and forwards the IP data packet to the destination indicated in the destination address of the IP data packet via the corresponding network interfaces.

Figure 0003:
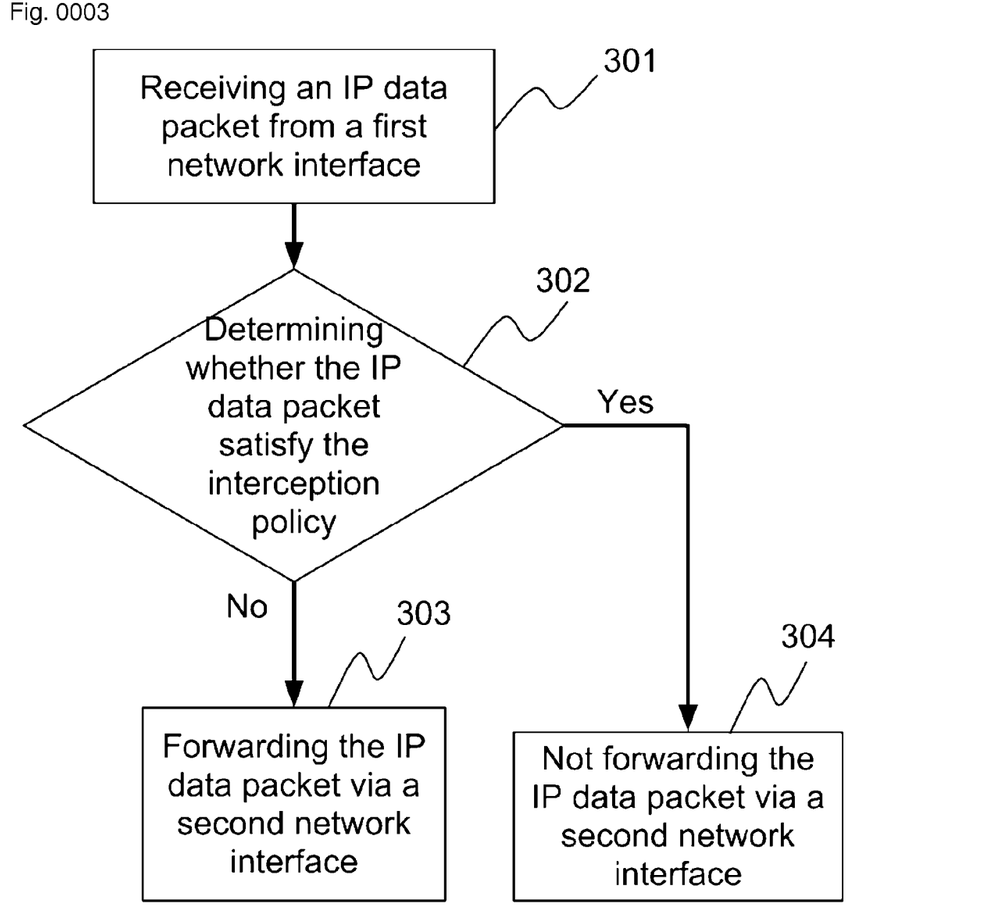

FIG. 3 shows one of the embodiments of the present invention in a flow diagram providing details with respect to receiving a first IP data packet from a first network interface at a network gateway. FIG. 3 should be viewed in conjunction with FIG. 2.

When network gateway 170 receives an IP data packet from router 111 via network interface 171 with a destination address reachable via network interface 172 at step 301, network gateway 170 inspects the IP data packet to check whether the IP data packet satisfies an interception policy at step 302. If the IP data packet satisfies the interception policy, network gateway 170 does not forward the IP data packet via network interface 172. If the IP data packet does not satisfy the interception policy, network gateway 170 forwards the IP data packet via network interface 172 according to the destination address of the IP data packet.

Similarly, when network gateway 170 receives an IP data packet from firewall 150 via network interface 172 with a destination address reachable via network interface 171 at step 301, network gateway 170 inspects the IP data packet to check whether the IP data packet satisfies the interception policy at step 302. If the IP data packet satisfies the interception policy, network gateway 170 does not forward the IP data packet via network interface 171. If the IP data packet does not satisfy the interception policy, network gateway 170 forwards the IP data packet via network interface 171.

For example, the IP addresses at network interfaces 112, 113, 151, 152, 153, 162 and 163 are 2.2.2.1, 2.2.2.2, 2.2.2.3, 2.2.2.4, 2.2.2.5, 2.2.2.6, and 2.2.2.7 respectively. Reachable addresses of network interface 172 are 2.2.2.3, 2.2.2.4, 2.2.2.5, 2.2.2.6, and 2.2.2.7. Reachable addresses of network interface 171 are 2.2.2.1, 2.2.2.2, and IP addresses belonging to inter-connected networks 101.

According to one of the embodiments of the present invention, when host 161 transmits an IP data packet with destination address 2.2.2.2, i.e. network interface 113 of router 111, and the IP data packet satisfies an interception policy, network gateway 170 therefore intercepts the IP data packet and does not forward the IP data packet to router 111. Network gateway 170 will process the intercepted IP data packet.

According to one of the embodiments of the present invention, after network gateway 170 receives the IP data packet, network gateway 170 responds to the IP data packet by transmitting a responding message through another one or more IP data packet via network interface 172 to host 161. The destination and source addresses of the one or more responding IP data packets are the source address of the IP data packet received, and an IP address reachable via one or more of the network interfaces, other than the network interface transmitting the one or more responding IP data packets, respectively.

According to one of the embodiments of the present invention, the payload of IP data packets originating from a node and received by network gateway 170 contains a request to network gateway 170 for status reporting and/or management instructions to network gateway 170. After inspecting the payload of the IP data packets, network gateway 170 determines that the IP data packets are intended for itself and intercepts the IP data packets. To respond to the intercepted IP data packets, network gateway 170 creates responding IP data packets with payload to respond to the request for status reporting and/or management instructions. The destination address of the intercepted IP data packets belong to one of the IP address of nodes that are reachable through network interface 172. The source address of the responding IP data packets is the same as the destination address of the received IP data packets.

According to one of the embodiments of the present invention, the network gateway inspects the port number or the options field of the received IP data packet to determine whether an interception policy is satisfied. According to one of the embodiments of the present invention, the network gateway inspects the payload of the received IP data packet to determine whether an interception policy is satisfied.

According to one of the embodiments of the present invention, the payload of the received IP data packet is encrypted and is decryptable by the network gateway. According to one of the embodiments of the present invention, after the network gateway has determined that the received IP data packet satisfies an interception policy, the payload of the received IP data packet is decrypted. According to one of the embodiments of the present invention, the network gateway decrypts the payload of the received IP data packets satisfies a policy to determine whether the received IP data packet satisfies the interception policy. If the network gateway cannot decrypt the payload of the received IP data packets and if the interception decision is based on the contents of the payload, the network gateway will then conclude that the received IP data packets do not satisfy the interception policy.

Interception Policy

Network gateway, such as network gateway 170, determines to intercept an IP data packet if the IP data packet satisfies an interception policy. The interception policy is a set of conditions, constraints, and settings to determine whether an IP data packet should be intercepted.

According to one of the embodiments of the present invention, the interception policy is based on the port number of the received IP data packets. For example, if the interception policy is to intercept IP data packet with source port number 8000, then all received IP data packets with source port number 8000 are intercepted. In another example, if the interception policy is to intercept IP data packet with destination port number 8888, then all received IP data packets with destination port number 8888 are intercepted.

According to one of the embodiments of the present invention, the interception policy is to intercept received IP data packets if the content of the option field of the received IP data packets matches with a predefined value. For example, the predefined value can be one at the twentieth bit of the option field.

According to one of the embodiments of the present invention, the interception policy is based on the destination address of the received IP data packet. For example, the interception policy is to intercept IP data packets if the destination address of the IP data packets matches a predefined IP address.

According to one of the embodiments of the present invention, the interception policy is based on a plurality of contents in the header of the received IP data packet. For example, the interception policy is to intercept IP data packets if the destination address of the IP data packets belongs to a particular subnet and the destination port number is 65332.

According to one of the embodiments of the present invention, the interception policy is based on the contents of the payload in the received IP data packet. For example, the interception policy is to intercept IP data packets if the IP data packets contain a predefined word.

A Plurality of Network Interfaces

Figure 0004:
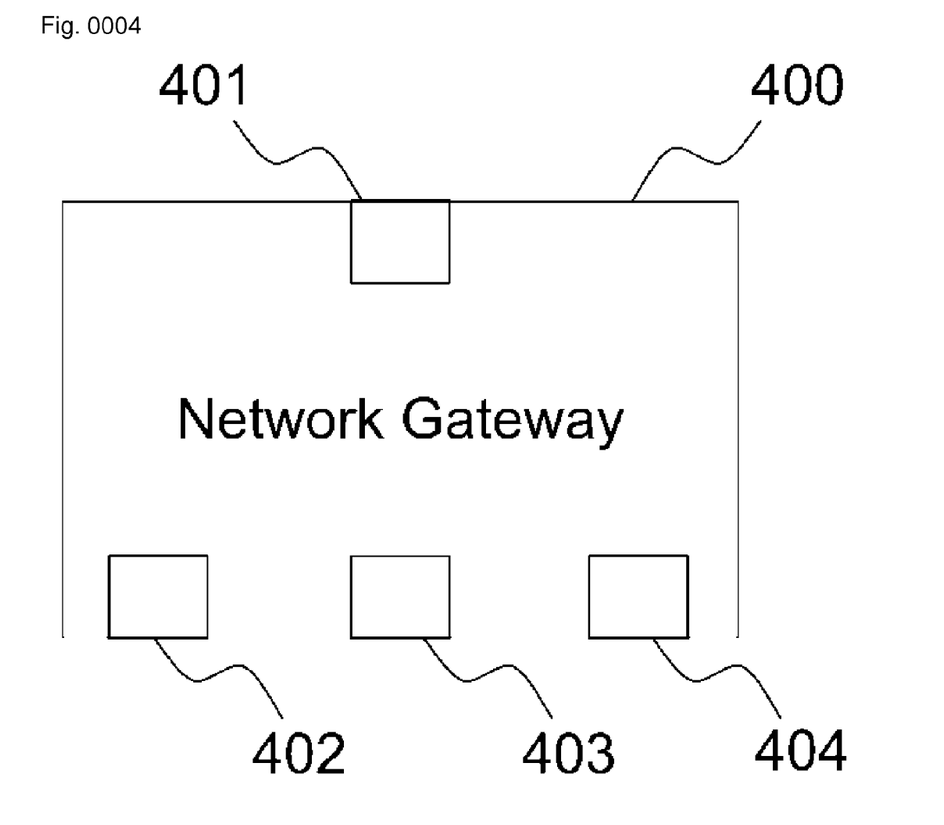

FIG. 4 shows a network gateway implementing one of the embodiments of the present invention. Network gateway 400, like network gateway 170, is placed between a router and a firewall. Network gateway 400 has four network interfaces 401, 402, 403 and 404. None of the four network interfaces 401, 402, 403 and 404 is assigned with an IP address. When network interface 401 receives an IP data packet with destination address reachable via one or more of network interfaces 402, 403 and 404, network gateway 400 does not forward the IP data packet via any of network interfaces 402, 403, and 404 if the IP data packet satisfies an interception policy. On the other hand, if the IP data packet does not satisfy the interception policy, network gateway 400 forwards the IP data packet via one or more of network interfaces 402, 403 and 404 according to the destination address of the IP data packet.

Similarly, when network interfaces 402, 403 and 404 receive IP data packets from computing device(s) or network node(s) with destination addresses reachable via network interface 401 at step 301, network gateway 400 inspects the IP data packets to check whether the IP data packets satisfy the interception policy at step 302. If the IP data packets satisfy the interception policy, network gateway 400 does not forward the IP data packets via network interface 401. If the IP data packets do not satisfy the interception policy, network gateway 400 forwards the IP data packet via network interface 401.

According to one of the embodiments of the present invention, an interception policy is satisfied if the destination address of the received IP data packet matches with a predefined IP address. According to one of the embodiments of the present invention, the predefined IP address is a link-local IP address. For example, in IPv4, the predefined IP address is in the block 169.254.0.0/16; in IPv6, the predefined IP address is in IP address in the block fe80::/10.

Transmitting an IP Data Packet

According to one of the embodiments of the present invention, when sending an IP data packet, it is possible to have the source address of the IP data packet to be any IP address. However, in order to allow the receiver of the IP data packet to respond, the source address of the IP data packet is not arbitrary. According to one of the embodiments of the present invention, as the network interface used to transmit the IP data packet is not assigned with an IP address, the source address of the IP data packet is set to an IP address which is reachable via one of network interfaces of the network gateway, excluding the network interface that is used to transmit the IP data packet, as the source address of the IP data packet. Therefore, the receiver of IP data packet may respond with one or more IP data packets that will arrive at the network gateway.

Again, for example, the IP addresses at network interfaces 112, 113, 151, 152, 153, 162 and 163 are 2.2.2.1, 2.2.2.2, 2.2.2.3, 2.2.2.4, 2.2.2.5, 2.2.2.6, and 2.2.2.7 respectively. When network gateway 170 transmits an IP data packet via network interface 171 and the IP data packet is originated from network gateway 170, the source address of the IP data packet is configured with an address reachable via network interface 172. Therefore, the source address of the IP data packet is configured with one of 2.2.2.3, 2.2.2.4, 2.2.2.5, 2.2.2.6, and 2.2.2.7. Similarly when network gateway 170 transmits an IP data packet via network interface 172 and the IP data packet is originated from network gateway 170, the source address of the IP data packet is configured with an address reachable via network interface 171. Therefore, the source address of the IP data packet is configured with one of 2.2.2.1, 2.2.2.2, and IP addresses belonging to interconnected networks 101.

A Plurality of Network Interfaces

According to one of the embodiments of the present invention, if a network gateway has more than two network interfaces, the source address of the IP data packet originated from the network gateway is configured with an IP address reachable via one or more of the plurality of network interfaces, other than the network interface transmitting the IP data packet.

According to one of the embodiments of the present invention, when network gateway 400 transmits an IP data packet originated from itself via network interface 401, the source address of the IP data packet is an IP address reachable via one of network interfaces 402, 403 and 404. Similarly when network gateway 400 transmits an IP data packet originated from itself via one of network interfaces 402, 403 and 404, the source address of the IP data packet is an IP address reachable via network interface 401.

WAN and LAN Interfaces

According to one of the embodiments of the present invention, a network gateway has one wide area network (WAN) interface and one or more local area network (LAN) interfaces.

When the network gateway receives an IP data packet from the WAN interface, the network gateway inspects the IP data packet to check whether the IP data packet satisfies any of at least one interception policy. If the IP data packet satisfies at least one interception policy, the network gateway does not forward the IP data packet to any of the LAN interfaces. If the IP data packet does not satisfy any of the at least one policy, the network gateway forwards the IP data packet via one or more of the LAN interface according to the destination address of the IP data packet.

Similarly, when the network gateway receives an IP data packet from one of the LAN interfaces with a destination address reachable via the WAN interface, the network gateway inspects the IP data packet to check whether the IP data packet satisfies any of at least one policy. If the IP data packet satisfies at least one policy, the network gateway does not forward the IP data packet to the WAN interface. If the IP data packet does not satisfy any of the at least one policy, the network gateway forwards the IP data packet via the WAN interface according to the destination address of the IP data packet.

When the network gateway transmits an IP data packet that is originated by itself via the WAN interface, the source address of the IP data packet is configured with one of source addresses that is reachable via one or more of the LAN interfaces.

When the network gateway transmits an IP data packet that is originated by itself via one of the LAN interfaces, the source address of the IP data packet is configured with one of source addresses that is reachable via the WAN interface.

Multiple WAN Interfaces

Figure 0005:
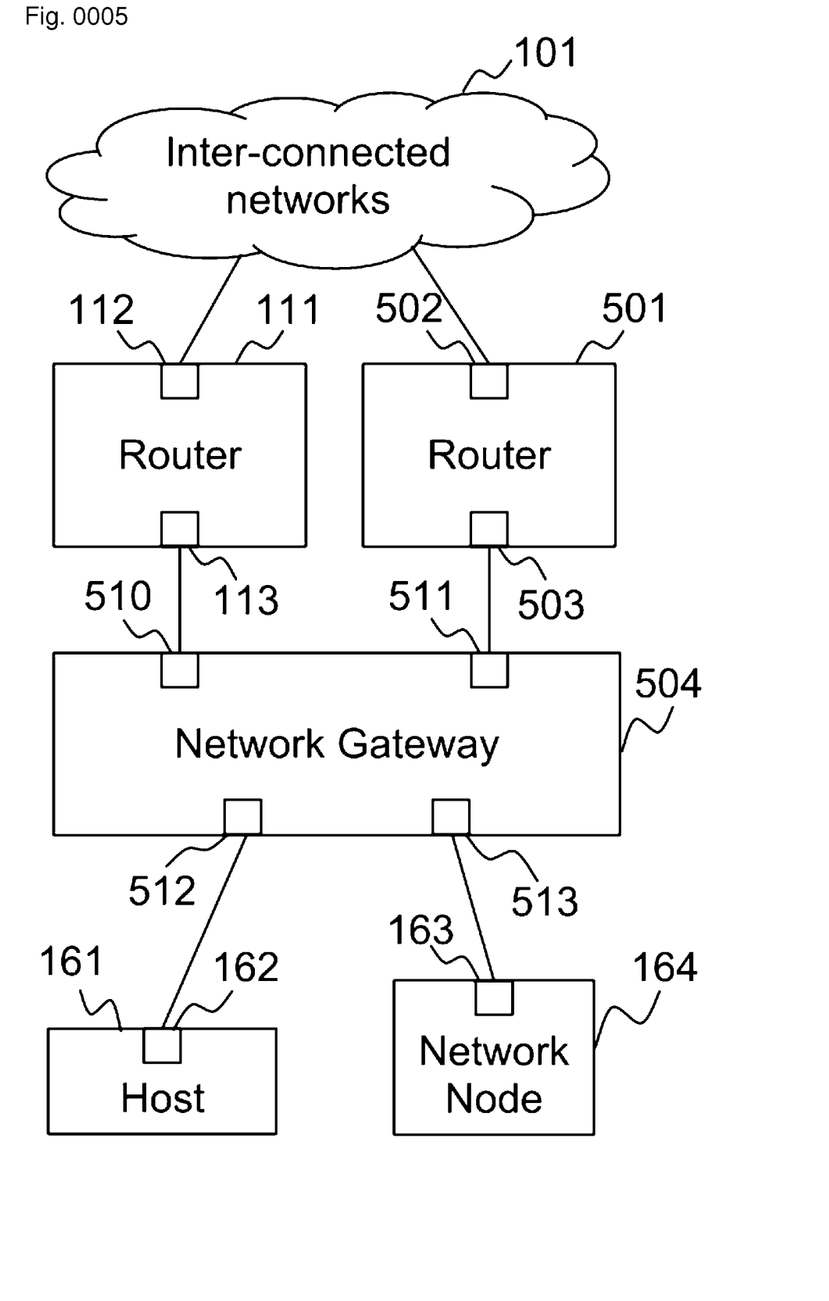
Figure 0006:
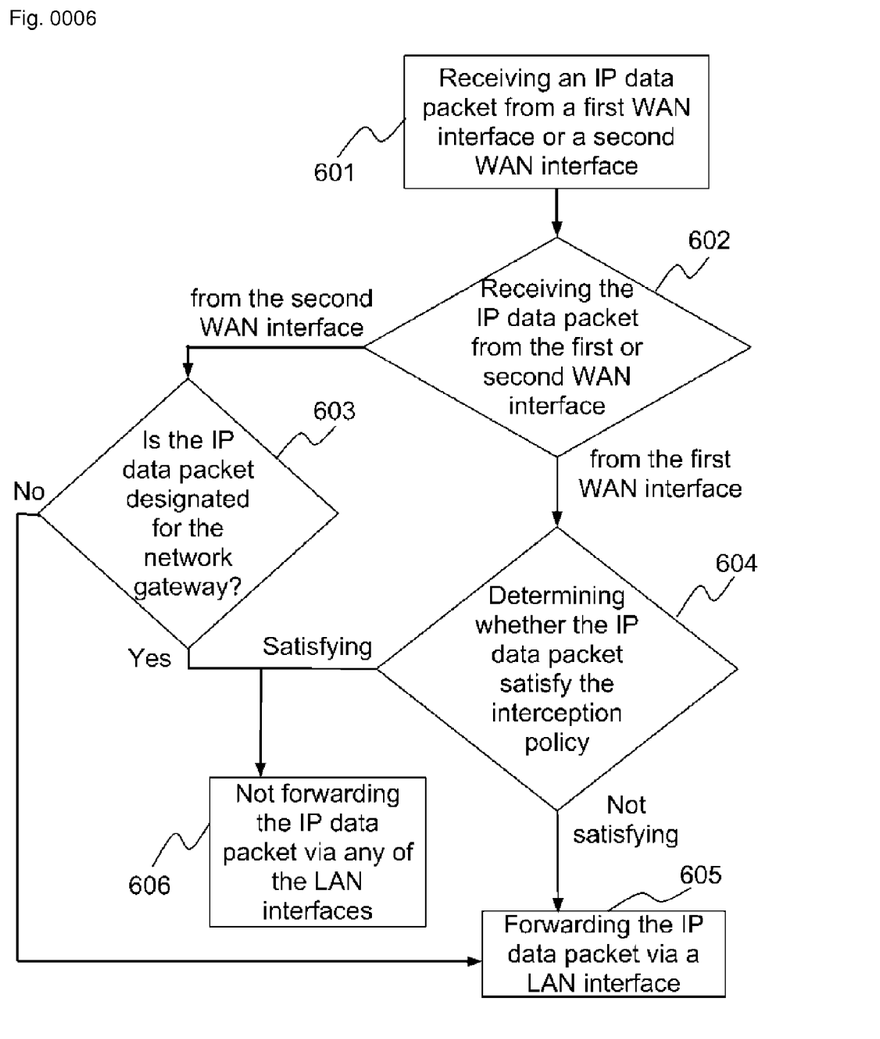

FIG. 6 shows one of the embodiments of the present invention of a flow diagram providing details with respect to receiving a data packet from a WAN interface. FIG. 6 should be viewed in conjunction with FIG. 5.

FIG. 5, based on FIG. 2, shows a network gateway implementing one of the embodiments of the present invention. Network gateway 504 has two WAN interfaces 510 and 511 and two LAN interfaces 512 and 513. WAN interface 511 is assigned with an IP address. WAN interface 510 and LAN interfaces 512 and 513 are not assigned with IP address. Host 161 and network node 164 are connected directly with network gateway 504 via network interfaces 162 and 163 respectively. WAN interface 511 is connected to network interface 503 of router 501. Router 501 connects to inter-connected networks 101 via network interface 502.

When network gateway 504 receives an IP data packet at step 601 from one of the WAN interfaces, network gateway 504 determines whether the IP data packet is received via WAN interface 510 or WAN interface 511 at step 602. If the IP data packet is received via WAN interface 511, at step 603 the destination address of the IP data packet is examined to determine whether the IP data packet is designated for network gateway 504. An IP data packet which is designated for network gateway 504 should have the IP address of WAN interface 511 as the destination address. If the IP data packet is not designated for network gateway 504, network gateway 504 forwards the IP data packet either to host 161 or network node 164 via LAN interface 512 or 513, respectively, according to the destination address of the IP data packet at step 605. If the IP data packet is designated for network gateway 504, network gateway 504 does not forward the IP data packet and network gateway 504 may process the IP data packet at step 606.

If the IP data packet is received via WAN interface 510, network gateway 504 inspects the IP data packet to check whether the IP data packet satisfies an interception policy at step 604. If the IP data packet satisfies the interception policy, network gateway 504 does not forward the IP data packet at step 606. If the IP data packet does not satisfy the interception policy, network gateway 504 forwards the IP data packet either to host 161 or network node 164 via LAN interface 512 or 513, respectively, according to the destination address of the IP data packet at step 605.

Figure 0007:
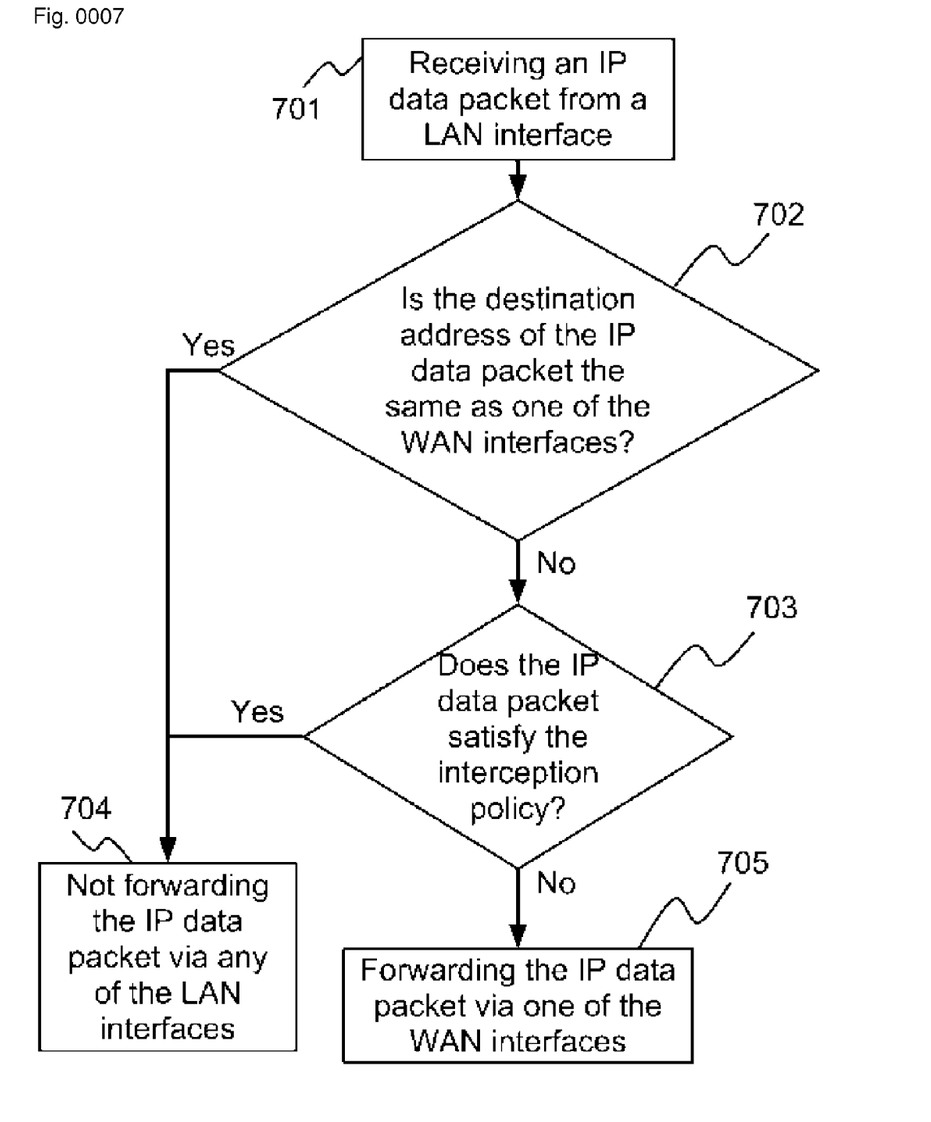

FIG. 7 shows one of the embodiments of the present invention in a flow diagram providing details with respect to receiving a data packet from a LAN interface. FIG. 7 should be viewed in conjunction with FIG. 5.

At step 701, network gateway 504 receives an IP data packet from host 161 or network node 164 via LAN interface 512 or 513, respectively. At step 702, network gateway 504 determines whether the destination address of the IP data packet is the IP address of WAN interface 511. If the destination address of the IP data packet is the IP address of WAN interface 511, network gateway 504 does not forward the IP data packet via WAN interface 510 or 511 at step 704 because the IP data packet is intended for network gateway 504.

If the destination address of the IP data packet is not the IP address of WAN interface 511, if the destination address is a reachable IP address via WAN interface 510 or 511 and if the IP data packet satisfies the interception policy at step 703, network gateway 504 also does not forward the IP data packet via WAN interface 510 or 511 at step 704.

If the destination address of the IP data packet is not the IP address of WAN interface 511, if the destination address is a reachable IP address via WAN interface 510 or 511 and if the IP data packet does not satisfy the interception at step 703, the IP data packet is forwarded via one of WAN interfaces 510 or 511 at step 705. If the IP address of IP data packet is only reachable via one of the WAN interfaces, the IP data packet is forwarded via the one of the WAN interface at step 705. If the IP address of IP data packet is reachable via more than one WAN interface, network gateway 504 determines which WAN interface is used to forward the IP data packet at step 705. It would be appreciated by those skilled in the arts that there are many known techniques to determine which WAN interface should be used to forward the IP data packet at step 705, including using route table and network performance data.

Systems

Figure 0008:
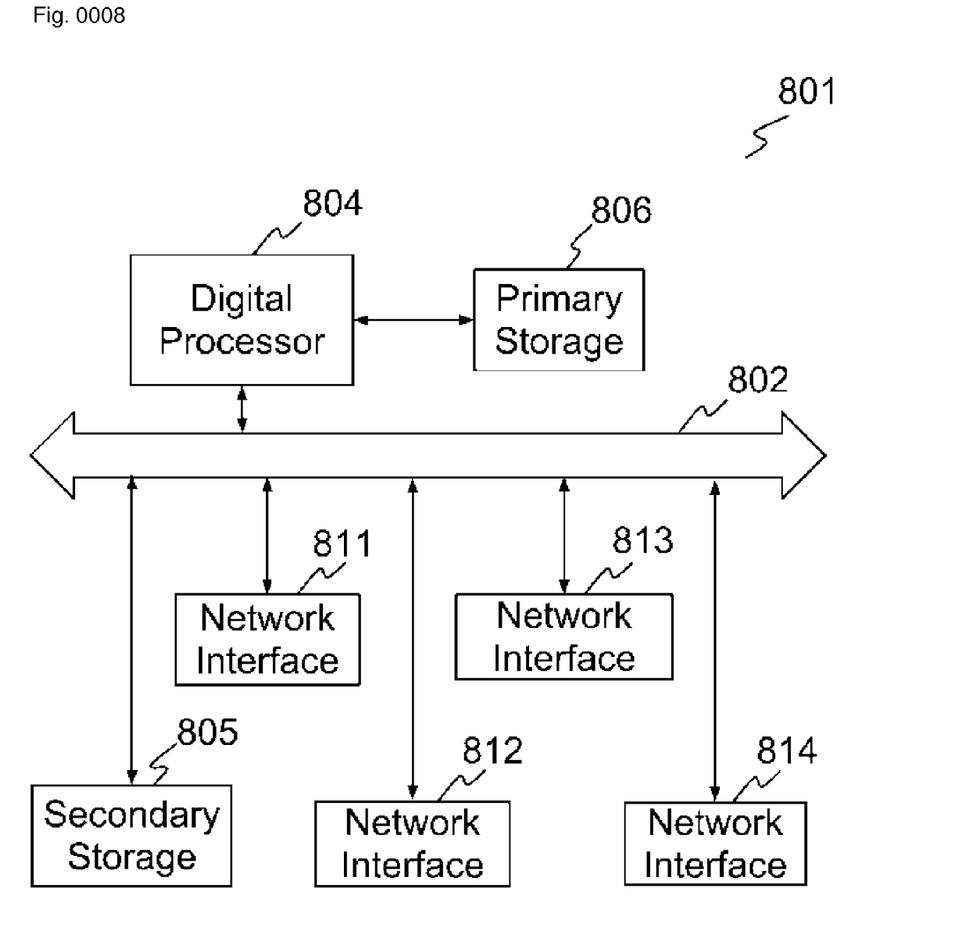

FIG. 8 illustrates one of the embodiments of present invention of a network node receiving and transmitting IP data packets in accordance with the present invention. Network gateway 801 can operate as one of the network gateways 170, 400 and 504. Network gateway 801 comprises a digital processor(s) 804, a primary storage 806, a secondary storage 805, and network interfaces 811, 812, 813 and 814. Network interfaces 811, 812, 813 and 814 are for use with other network apparatus such as Ethernet switches, IP routers and other packet network nodes, network management and provisioning systems, local PCs, etc. Network interfaces 811, 812, 813 and 814 are capable of operating as LAN interface(s) and/or WAN interface(s). Other components which may be utilized within network gateway 801 include amplifiers, board level electronic components, as well as media processors and other specialized SoC or ASIC devices. Support for various processing layers and protocols (e.g., 802.3, DOCSIS MAC, DHCP, SNMP, H.323/RTP/RTCP, VoIP, SIP, etc.) may also be provided as required.

Network gateway 801 may take any number of physical forms, comprising for example one of a plurality of discrete modules or cards within a larger network edge or hub device of the type well known in the art and may also comprise firmware, either alone or in combination with other hardware/software components. Alternatively, network gateway 801 may be a stand-alone device or module disposed at other computing device or network node, and may even include its own radio frequency (RF) front end (e.g., modulators, encryptors, etc.) or optical interface so as to interface directly with other computing devices and network nodes.

Numerous other configurations may be used. Network gateway 801 may also be integrated with other types of components (such as mobile base stations, satellite transceivers, video set-top box, encoders/decoders, etc.) and form factors if desired.

Digital processor(s) 804 and may be implemented by using one or more central processing units, network processors, microprocessors, micro-controllers, FPGAs, ASICs or any device capable of performing instructions to perform the basic arithmetical, logical, and input/output operations of the system.

Primary storage 806 and secondary storage 805 may be implemented by using at least one DRAM, SDRAM, SRAM, Flash RAM, optical memory, magnetic memory, hard disk, and/or any computer readable media that are able to provide storage capability. Preferably, primary storage 806 is implemented with DRAM, SDRAM and/or SRAM and is used as temporary storage or cache. Secondary storage 805 may be used to provide instructions to digital processor(s) 804, to provide storage to store identifiers, conditions, network performance statistics and other data to facilitate the operation of the network node. Secondary storage 805 is also used to store an interception policy(s) which is used by digital processor(s) 804.

Network interfaces 811, 812, 813 and 814 may be implemented using serial bus, universal serial bus (USB) parallel bus, a universal asynchronous receiver/transmitter (UART), Peripheral Component Interconnect (PCI), local bus, or other electronic components connecting technology to connect digital processor(s) 804 and an agent, which is used to be connected with optical fiber, cable, or antenna. In one variant, at least one network interface is in the digital processor(s) 804 and therefore the agent for connecting with optical fiber, cables or antenna may directly connect with the digital processor(s) 804. In one variant, at least one network interface may connect to an Ethernet port for Ethernet network connection. In one variant, at least one network interface may connect to a WiFi adapter for WiFi network connection. In one variant, at least one network interface may connect to a USB port and the USB port may connect to an external modem for wireless WAN connection, such as a USB 3G modem, USB LTE modem, USB WiMax Modem, USB WiFi Modem, or other modem for wireless communications. In one variant, all network interfaces connect a plurality of USB ports for external modem connections. In one variant, all network interfaces connect to circuitry inside network gateway 801. Myriad other combinations and permutations of the foregoing will be appreciated by those of ordinary skill given the present disclosure.

According to one of the embodiments of the present invention, network interface 811 and 812 are not assigned with IP addresses. When network gateway 801 receives an IP data packet via network interface 811 with a destination address reachable via network interface 812, the IP data packet is sent to digital processor(s) 804 for examination through system bus 802. Digital processor(s) 804 examines the IP data packet to determine whether the IP data packet satisfies an interception policy stored at secondary storage 805. If the IP data packet satisfies the interception policy, digital processor(s) 804 does not forward the IP data packet. If the IP data packet does not satisfy the interception policy, digital processor(s) 804 forwards the IP data packet via network interface 812 according to the destination address of the IP data packet.

Similarly, when network gateway 801 receives an IP data packet via network interface 812 with a destination address reachable via network interface 811, the IP data packet is sent to digital processor(s) 804 for examination through system bus 802. Digital processor(s) 804 inspects the IP data packet to determine whether the IP data packet satisfies the interception policy. If the IP data packet satisfies the interception policy, digital processor(s) 804 does not forward the IP data packet. If the IP data packet does not satisfy the interception policy, digital processor(s) 804 forwards the IP data packet via network interface 811.

According to one of the embodiments of the present invention, after network gateway 801 receives an IP data packet via a receiving network interface, i.e. one of network interfaces 811, 812, 813 or 814, digital processor(s) 804 responds to the IP data packet by transmitting a responding message encapsulated in one or more IP data packets via the receiving network interface. The destination address of the one or more responding IP data packets is the source address of the received IP data packet. The source address of the one or more responding IP data packets is one of the IP addresses reachable via one of the plurality of network interfaces, other than the receiving network interface.

According to one of the embodiments of the present invention, the payload of the received IP data packets contains request of status from network gateway 801 and the payload of the responding IP data packets contains status information of the network gateway 801 generated by digital processor(s) 804.

According to one of the embodiments of the present invention, the payload of the received IP data packets contain instructions for digital processor(s) 804 to configure network gateway 801 and the payload of the responding IP data packets transmitted contain operation results of network gateway 801 generated by digital processor(s) 804.

According to one of the embodiments of the present invention, digital processor(s) 804 inspects the port number or the options field of the received IP data packet to determine whether a policy is satisfied. According to one of the embodiments of the present invention, digital processor(s) 804 inspects the payload of the received IP data packet to determine whether a policy is satisfied.

According to one of the embodiments of the present invention, digital processor(s) 804 is capable of encrypting payload encapsulated in IP data packets transmitted by network gateway 801 and is capable of decrypting payload encapsulated in IP data packets received by network gateway 801. According to one of the embodiments of the present invention, after digital processor(s) 804 has determined that the received IP data packet satisfies an interception policy, the payload of the received IP data packet is decrypted by digital processor(s) 804.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

BRIEF DESCRIPTION OF DRAWINGS

FIG. 1 is a network diagram illustrating the use of network devices via a plurality of logical network connections according to one of the embodiments of the present invention in a typical network environment.

FIG. 2 is a network diagram illustrating the use of network devices via a plurality of logical network connections according to one of the embodiments of the present invention in a typical network environment.

FIG. 3 shows one of the embodiments of the present invention in a flow diagram providing details with respect to receiving a first IP data packet from a first network interface at a network gateway.

FIG. 4 shows a network gateway implementing one of the embodiments of the present invention.

FIG. 5 is a network diagram illustrating a network gateway implementing one of the embodiments of the present invention.

FIG. 6 shows one of the embodiments of the present invention of a flow diagram providing details with respect to receiving a data packet from a WAN interface.

FIG. 7 shows one of the embodiments of the present invention in a flow diagram providing details with respect to receiving a data packet from a LAN interface.

FIG. 8 illustrates one of the embodiments of present invention of a network node receiving and transmitting IP data packets in accordance with the present invention.

The invention claimed is:

1. A method for receiving and transmitting Internet Protocol (IP) data packets, comprising:
   (a) transmitting a first IP data packet via a second network interface of a first network gateway if the first IP data packet does not satisfy an interception policy;
   (b) not transmitting the first IP data packet via the second network interface and decrypting the first IP data packet if the first IP data packet satisfies the interception policy;
   wherein the first network interface and the second network interface are not assigned with IP addresses;
   wherein the first IP data packet is either received by the first network gateway via a first network interface of the first network gateway or created by the first network gateway;
   wherein source address of the first IP data packet is an IP address reachable via the first network interface when the first IP data packet is created by the first network gateway wherein the interception policy is based on port number, and wherein step (b) is performed if a source port number of the first IP data packet is a predefined port number;
   wherein the interception policy is based on contents of a header of the first IP data packet, wherein step (b) is performed if a destination address of the first IP data packet belongs to a predefined subnet and a destination port is a predefined destination port;
   wherein the first network interface is a wide area network (WAN) interface, or a local area network (LAN) interface;
   when the first network interface is a LAN interface:
   (i) determining whether destination address of the first IP data packet is the IP address of the second network interface, wherein the second network interface is a WAN interface:
   (ii) not transmitting the first IP data packet if the destination address of the first IP data packet is not the IP address of the second network interface.

2. The method of claim 1, further comprising:
   transmitting a second IP data packet via the first network interface when the first IP data packet is received by the first network gateway and satisfies the interception policy;
   wherein the second IP data packet is a response to the first IP data packet:
   wherein source address of the second IP data packet is an IP address reachable via the first network interface; and wherein destination address of the second IP data packet is the source address of the first IP data packet.

3. The method of claim 2, further comprising encrypting the second IP data packet before transmitting the second IP data packet.

4. The method of claim 1, wherein the first network interface is assigned with an IP address, wherein the IP address does not belong to a same IP subnet with one or more nodes connected to the first network interface.

5. The method of claim 1, wherein the second network interface is assigned with an IP address, wherein the IP address does not belong to a same IP subnet with one or more nodes connected to the second network interface.

6. The method of claim 1, wherein the interception policy is based on in part destination port number of the first IP data packet.

7. The method of claim 1, wherein the interception policy is based on in part option field of the first IP data packet.

8. The method of claim 1, wherein the interception policy is based on in part destination address of the first IP data packet with a predefined value.

9. The method of claim 1, wherein the interception policy is based on in part a payload of the first IP data packet.

10. The method of claim 9, wherein the payload of the first IP data packet is decrypted for determining whether the first IP data packet satisfies the interception policy.

11. The method of claim 9, wherein the payload of the first IP data packet contains operation status of the first network gateway.

12. The method of claim 1, wherein the first network interface is assigned with an Internet Protocol Version 4 (IPv4) address, wherein the IPv4 address is in the address block 169.254.0.0 through 169.254.254.255.

13. The method of claim 1, wherein the first network interface is assigned with an Internet Protocol Version 6 (IPv6) address, wherein the IPv6 address is in the address block fe80::/10.

14. A method for receiving and transmitting Internet Protocol (IP) data packets in a first network gateway, wherein the first network gateway has a plurality of Wide Area Network (WAN) interfaces and at least one Local Area Network (LAN) interface, comprising:
   (a) when receiving a first IP data packet from a first WAN interface, forwarding the first IP data packet via at least one of the at least one LAN interface if the first IP data packet does not satisfy any of at least one interception policy, and not forwarding the first IP data packet via any of the at least one LAN interface if the first IP data packet satisfies any of the at least one interception policy, wherein destination address of the first IP data packet is reachable via at least one of the at least one LAN interface;
   (b) when transmitting a second IP data packet via the first WAN interface, source address of the second IP data packet is an IP address reachable via the at least one LAN interface, wherein the second IP data packet is originated from the first network gateway;
   (c) when receiving a third IP data packet from a second WAN interface, forwarding the third IP data packet via at least one of the at least one LAN interface if destination address of the third IP data packet does not match IP address of the second WAN interface, and not forwarding the third IP data packet if the destination address of the third IP data packet matches the IP address of the second WAN interface;
   (d) when transmitting a fourth IP data packet via the second WAN interface, source address of the fourth IP data packet is either an IP address reachable via the at least one LAN interface or the IP address of the second WAN interface, wherein the fourth IP data packet is originated from the first network gateway;

(e) when receiving a fifth IP data packet from one of the at least one LAN interface, forwarding the fifth IP data packet via one of the plurality of WAN interfaces if destination address of the fifth IP data packet does not match the IP address of the second WAN interface and if the fifth IP data packet does not satisfy any of the at least one interception policy, and not forwarding the fifth IP data packet if the destination address of the fifth IP data packet matches the IP address of the second WAN interface or if the fifth IP data packet satisfies any of the at least one interception policy;

when transmitting a sixth IP data packet via one of the at least one LAN interface, source address of the sixth IP data packet is an IP address reachable via at least one of the plurality of WAN interfaces, wherein the sixth IP data packet is originated from the first network gateway;

wherein the first WAN interface and the at least one LAN interface are not assigned with IP addresses and the second WAN interface is assigned with an IP address;

wherein the plurality of WAN interfaces are implemented using serial bus, universal serial bus (USB) parallel bus, a universal asynchronous receiver/transmitter (UART), Peripheral Component Interconnect (PCI), local bus, or other electronic components connecting technology;

wherein at least one of the plurality of WAN interfaces is connected to a WiFi adapter for WiFi network connection, at least one of the plurality of WAN interfaces is connected to an external modem via a USB port for wireless WAN connection.

15. A system for receiving and transmitting Internet Protocol (IP) data packets, wherein the system comprises:
at least one digital processor;
at least one primary storage;
a plurality of network interfaces; and
at least one secondary storage storing program instructions executable by the at least one digital processor for:

(a) transmitting a first IP data packet via a second network interface of the system if the first IP data packet does not satisfy an interception policy;

(b) not transmitting the first IP data packet via the second network interface and decrypting the first IP data packet if the first IP data packet satisfies the interception policy;

wherein the first network interface and the second network interface are not assigned with IP addresses:

wherein the first IP data packet is either received by the system via a first network interface of the system or created by the system;

wherein source address of the first IP data packet is an IP address reachable via the first network interface when the first IP data packet is created by the system;

wherein the interception policy is based on port number, and wherein step (b) is performed if a source port number of the first IP data packet is a predefined port number;

wherein the interception policy is based on contents of a header of the first IP data packet, wherein step (b) is performed if a destination address of the first IP data packet belongs to a predefined subnet and a destination port is a predefined destination port;

wherein the first network interface is a wide area network (WAN) interface, or a local area network (LAN) interface;

when the first network interface is a LAN interface:
(i) determining whether destination address of the first IP data packet is the IP address of the second network interface, wherein the second network interface is a WAN interface:
(ii) not transmitting the first IP data packet if the destination address of the first IP data packet is not the IP address of the second network interface.

16. The system of claim 15, further storing program instructions for:
transmitting a second IP data packet via the first network interface when the first IP data packet is received by the system and satisfies the interception policy;
wherein the second data packet is a response to the first IP data packet;
wherein source address of the second data packet is an IP address reachable via the first network interface; and
wherein destination address of the second data packet is the source address of the first IP data packet.

17. The system of claim 16, further comprising encrypting the second IP data packet before transmitting the second IP data packet.

18. The system of claim 15, wherein the first network interface is assigned with an IP address, wherein the IP address does not belong to a same IP subnet with one or more nodes connected to the first network interface.

19. The system of claim 15, wherein the second network interface is assigned with an IP address, wherein the IP address does not belong to a same IP subnet with one or more nodes connected to the second network interface.

20. The system of claim 15, wherein the interception policy is based on in part destination port number of the first IP data packet.

21. The system of claim 15, wherein the interception policy is based on in part option field of the first IP data packet.

22. The system of claim 15, wherein the interception policy is based on in part destination address of the first IP data packet with a predefined value.

23. The system of claim 15, wherein the interception policy is based on in part a payload of the first IP data packet.

24. The system of claim 23, wherein the payload of the first IP data packet is decrypted for determining whether the first IP data packet satisfies the interception policy.

25. The system of claim 23, wherein the payload of the first IP data packet contains operation status of the system.

26. The system of claim 15, wherein the first network interface is assigned with an Internet Protocol Version 4 (IPv4) address, wherein the IPv4 address is in the address block 169.254.0.0 through 169.254.254.255.

27. The system of claim 15, wherein the first network interface is assigned with an Internet Protocol Version 6 (IPv6) address, wherein the IPv6 address is in the address block fe80::/10.

* * * * *